US006668890B1

United States Patent
Kadota (10) Patent No.: US 6,668,890 B1
(45) Date of Patent: Dec. 30, 2003

(54) PNEUMATIC RADIAL TIRES (75) Inventor: Kuninobu Kadota, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/306,634

(22) Filed: May 7, 1999

(30) Foreign Application Priority Data

May 8, 1998 (JP) .............................. 10-142246

(51) Int. Cl.[7] .............................. B60C 9/18; B60C 9/20
(52) U.S. Cl. ..................... 152/534; 152/526; 152/535
(58) Field of Search ................... 152/534, 535, 152/526

(56) References Cited

U.S. PATENT DOCUMENTS

| 4,669,520 A | | 6/1987 | Koseki et al. | |
| 5,111,864 A | | 5/1992 | Nakano et al. | |
| 5,327,954 A | * | 7/1994 | Nakamura | 152/535 X |
| 5,637,163 A | * | 6/1997 | Kobayashi | 152/534 |

FOREIGN PATENT DOCUMENTS

| DE | 33 27 670 A1 | | 2/1985 | |
| EP | 0 581 503 A1 | | 2/1994 | |
| EP | 0 698 509 A2 | | 2/1996 | |
| GB | 1 483 053 | * | 8/1977 | .................. 152/534 |
| GB | 2 017 019 A | | 9/1979 | |
| JP | 50 132 604 | | 10/1975 | |
| LU | 87862 | | 5/1991 | |

* cited by examiner

*Primary Examiner*—Adrienne C. Johnstone
(74) *Attorney, Agent, or Firm*—Sughrue Mion, PLLC (57) ABSTRACT

In a pneumatic radial tire comprising a belt of at least two belt layers, in which the belt comprises a maximum-width belt layer containing many cords slantly arranged with respect to an equatorial plane of the tire and a narrow-width belt layer arranged at the outside of the maximum-width belt layer in the radial direction and containing many cords arranged in an oppositely inclined direction to the cords of the maximum-width belt layer, the belt end separation is controlled by arranging a reinforcing layer containing many cords arranged in an oppositely inclined direction to the cords of the maximum-width belt layer so as to overlap with an outer end portion of the maximum-width belt layer located outward from an outer end of the narrow-width belt layer in the widthwise direction thereof.

2 Claims, 9 Drawing Sheets

FIG. 1

FIG_2

FIG.3

FIG_4

FIG_9

PNEUMATIC RADIAL TIRES

BACKGROUND OF THE INVENTION

1. Field of the Invention

This invention relates to a pneumatic radial tire capable of controlling separation failure at belt end.

2. Description of Related Art

There are known pneumatic tires for truck, bus and the like, which are particularly used under a heavy load and recapped plural times after wearing of a tire tread. In this type of the tire, there has recently been caused a problem that cracks are created at a side end of a belt layer in a widthwise direction thereof in the use over a long time of period and grow inward in the widthwise direction or outward in the radial direction between the belt layers with the lapse of time to cause a separation failure and hence make the use of the tire impossible. Such cracks are considered to be created due to the following fact. That is, an end portion of the tread in the pneumatic radial tire is subjected to a tensional deformation in the circumferential direction every the contacting with a flat road surface due to an influence of crown radius. At the tread end portion subjected to such a tensional deformation are located outer side end portions of plural belt layers in which cords are slantly embedded in these layers in opposite directions with respect to an equatorial plane of the tire, so that the cords crossed with each other at this position are subjected to the above tensional deformation every the arrival at the ground contacting region and repeatedly deform in a direction of crushing a diamond shape. Also, such a deformation is caused when the tread end portion of the tire rides on projections such as stones and the like during the running on bad road to largely deform rubber in this end portion. As the cords are deformed as mentioned above, the width of the belt layer becomes narrow and hence the outer end of the belt layer in the widthwise direction somewhat displaces inward in the widthwise direction repeatedly, while rubber located outward from the outer end of the belt layer in the widthwise direction is left at this position. As a result, tensile strain in the widthwise direction is caused at the boundary between the rubber and the outer end of the belt layer in the widthwise direction. Moreover, the ends of the cords embedded in the belt layer are exposed at the outer end of the belt layer in the widthwise direction and are cut faces not subjected to brass plating or the like for enhancing an adhesion to rubber. As a result the ends of the cords are repeatedly pulled apart from the surrounding rubber due to the influence of the above tensile strain and hence slight cracks are created in the rubber located in the vicinity of the cord ends exposed at the outer end of the belt layer in the widthwise direction. On the other hand, the aforementioned displacement becomes maximum at a widthwise outer end of a narrow-width belt layer arranged at an outside of a maximum-width belt layer in the radial direction and containing cords arranged in an oppositely inclination direction to cords of the maximum-width belt layer. Therefore, it is considered that the above slight cracks are first created at the widthwise outer end of the narrow-width belt layer and developed by shearing strain or the like repeatedly produced between the belt layers during running with the lapse of time to cause separation failure at belt end (hereinafter referred to as belt end separation).

In order to solve this problem, there have hitherto been proposed a method of arranging a low-hardness and thick cushion rubber between the widthwise outer end of the maximum-width belt layer and the widthwise outer end of the narrow-width belt layer for controlling the shearing strain produced between the belt layers to prevent the development of the cracks, and a method of piling a reinforcing layer containing cords extended substantially in the circumferential direction on the belt layer for controlling the increase of the size of the belt layer accompanied with the inflation under inner pressure or the running to prevent the development of the cracks.

However, these methods can develop an effect to a certain level, but have a problem that the occurrence of the belt end separation can not sufficiently be controlled.

SUMMARY OF THE INVENTION

It is, therefore, an object of the invention to provide a pneumatic radial tire capable of effectively controlling the belt end separation.

According to the invention, there is the provision of in a pneumatic radial tire comprising a radial carcass of at least one rubberized cord ply toroidally extending between a pair of bead cores, a belt superimposed about a crown portion of the carcass and comprised of at least two belt layers, and a tread arranged at an outside of the belt in a radial direction, in which the belt comprises a maximum-width belt layer containing many cords slantly arranged with respect to an equatorial plane of the tire and a narrow-width belt layer arranged at the outside of the maximum-width belt layer in the radial direction and containing many cords arranged in an oppositely inclined direction to the cords of the maximum-width belt layer, an improvement wherein a reinforcing layer containing many cords arranged in an oppositely inclined direction to the cords of the maximum-width belt layer is arranged so as to overlap with an outer end portion of the maximum-width belt layer located outward from an outer end of the narrow-width belt layer in the widthwise direction thereof.

When the cords embedded in the widthwise outer end portions of the maximum-width belt layer and the narrow-width belt layer arrive at a ground contact region during the running of the pneumatic radial tire, a diamond shape defined by these cords is deformed in a crushed direction due to the influence of a crown curvature, whereby the widthwise outer end of the narrow-width belt layer displaces inward in the widthwise direction at maximum. Therefore, when the reinforcing layer is arranged to overlap with the widthwise outer end portion of the maximum-width belt layer located outward from the widthwise outer end of the narrow-width belt layer in the widthwise direction and contains many cords arranged in an oppositely inclination direction to the cords of the maximum-width belt layer, a diamond shape defined by the cords embedded in the reinforcing layer and the cords embedded in the maximum-width belt layer are also deformed in a crushed direction due to the same tensional deformation in the circumferential direction as mentioned above, so that the reinforcing layer, widthwise outer end portion of the maximum-width belt layer and rubber surrounding them (including rubber located outward from the widthwise outer end of the narrow-width belt layer in the widthwise direction) displace inward in the widthwise direction together, whereby the tensile strain in the widthwise direction produced at the boundary between the widthwise outer end of the narrow-width belt layer and the rubber located outward from the widthwise outer end in the widthwise direction is decreased (or it is a compression strain according to circumstances). As a result, the occurrence and development of cracks in the rubber located in the vicinity of cord ends of the narrow-width belt layer are effectively controlled and hence the belt end separation is effectively prevented.

In a preferable embodiment of the invention, the cords of the reinforcing layer are inextensible cords and the reinforcing layer is closely arranged at the inside of the maximum-width belt layer in the radial direction, or the widthwise outer end of the reinforcing layer is located inward from the widthwise outer end of the maximum-width belt layer in the widthwise direction, whereby the belt end separation of the narrow-width belt layer can surely be prevented while controlling the separation failure at the widthwise outer end of the reinforcing layer.

In another preferable embodiment of the invention, the widthwise inner end of the reinforcing layer is located in the vicinity of the widthwise outer end of the narrow-width belt layer and an inclination angle A of the cord embedded in the reinforcing layer with respect to the equatorial plane of the tire is within a range of 40° to 60°. In this case, the belt end separation of the narrow-width belt layer can further be prevented.

In the other preferable embodiment of the invention, the reinforcing layer is extended inward in the widthwise direction to form a one-piece body on the equatorial plane and an inclination angle B of the cord embedded in the reinforcing layer is not less than 34° with respect to the equatorial plane. In this case, the hoop effect of the belt can be enhanced while simplifying the production.

In a further preferable embodiment of the invention, the cords of the reinforcing layer are organic fiber cords and the reinforcing layer is arranged at the outside of the maximum-width belt layer in the radial direction. Even in this case, the belt end separation of the narrow-width belt layer can effectively be prevented.

In a still further preferable embodiment of the invention, the widthwise inner end of the reinforcing layer is located at the outside of the narrow-width belt layer in the radial direction and inward from the widthwise outer end thereof in the widthwise direction, and the widthwise outer end of the reinforcing layer is located outward from the widthwise outer end of the maximum-width belt layer in the widthwise direction, or further an inclination angle C of the cord embedded in the reinforcing layer is not less than 7° with respect to the equatorial plane. In this case, the belt end separation of the narrow-width belt layer can surely be prevented.

BRIEF DESCRIPTION OF THE DRAWINGS

The invention will be described with reference to the accompanying drawings, wherein.

DESCRIPTION OF PREFERRED EMBODIMENTS

Figure 1:
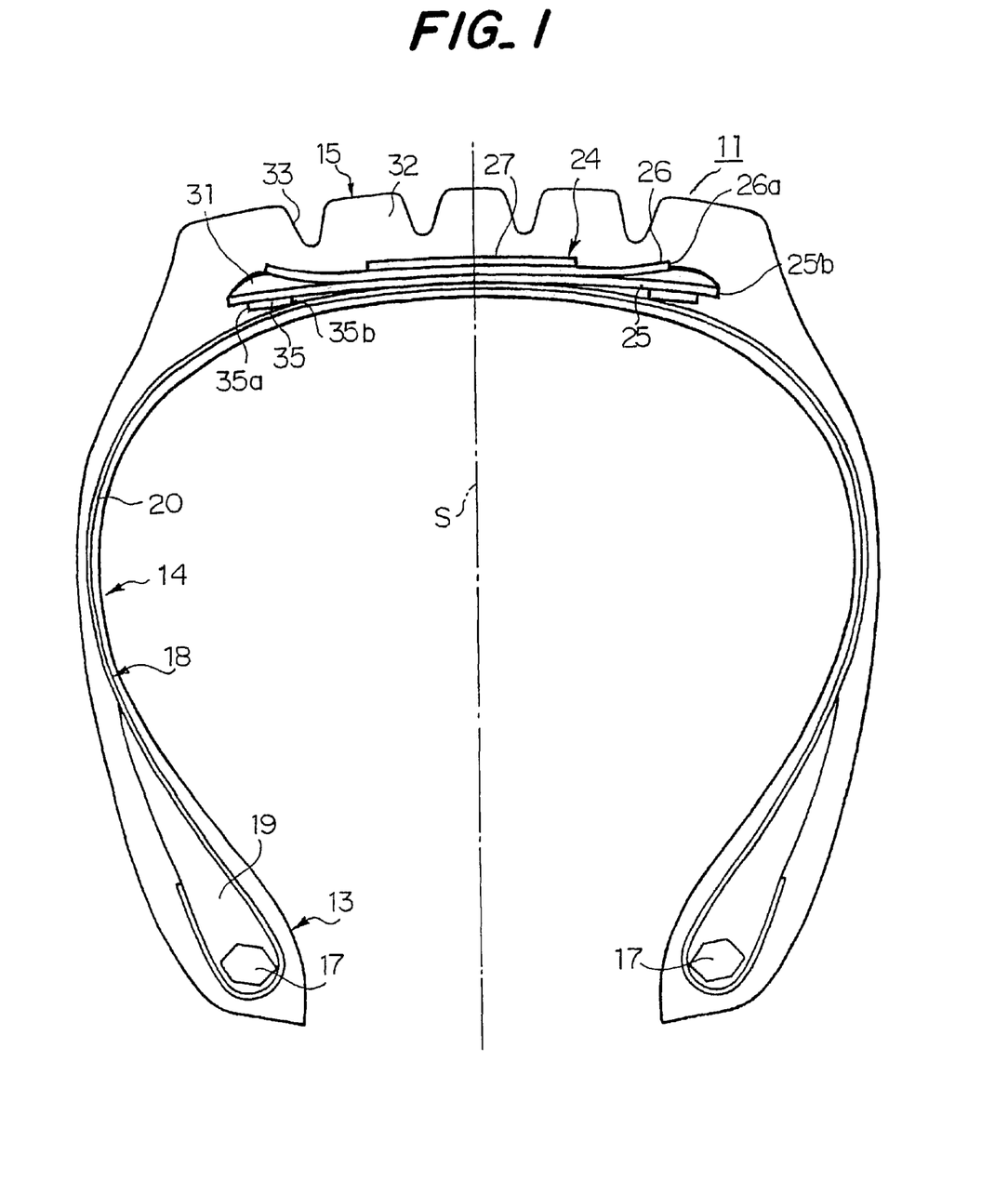
FIG. 1 is a diagrammatically section view of a first embodiment of the pneumatic radial tire according to the invention.
Figure 2:
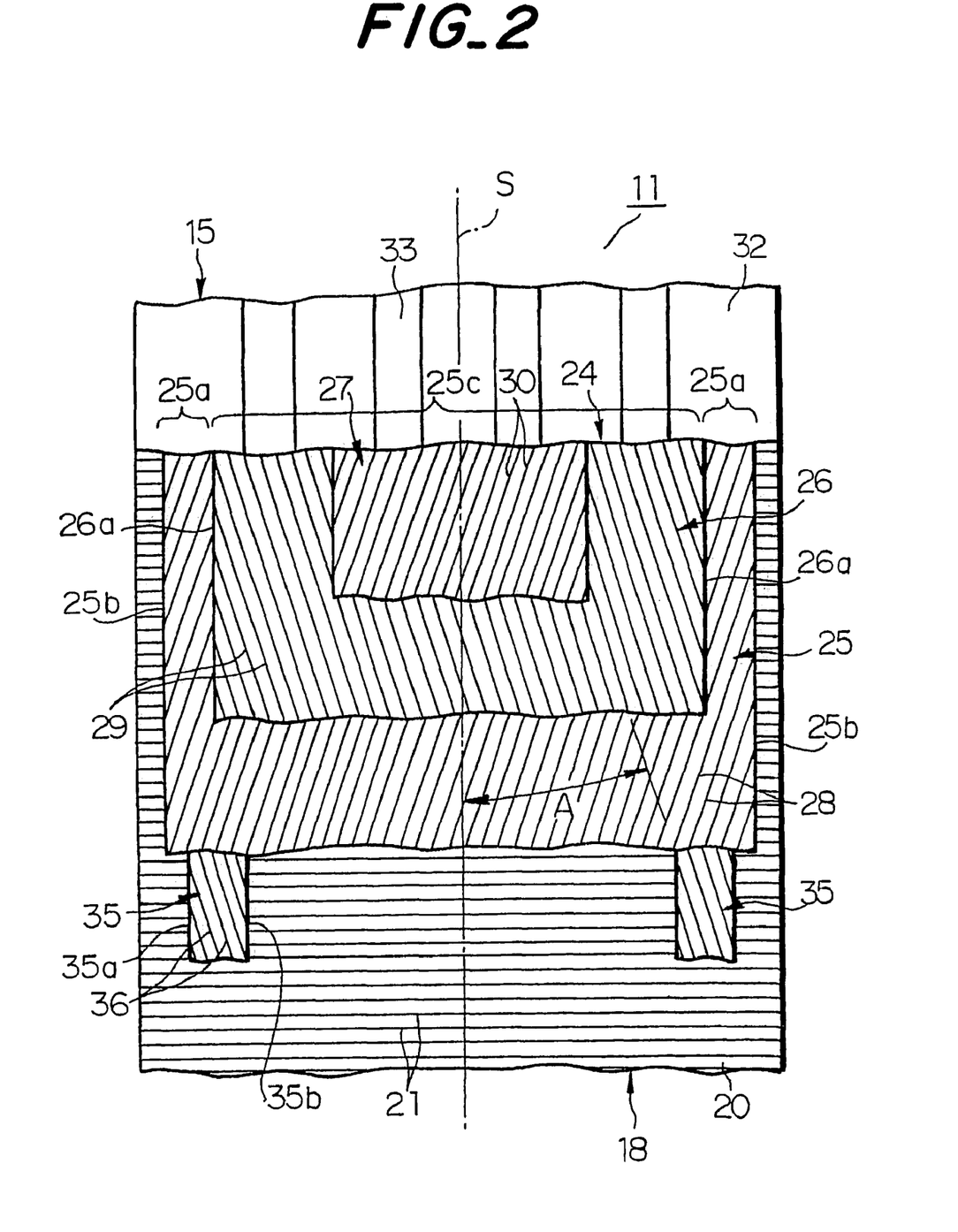
FIG. 2 is a plan view partly broken away of the tire shown in FIG. 1.

In FIGS. 1 and 2, numeral 11 is a first embodiment of the heavy duty pneumatic radial tire for use in truck and bus according to the invention. The tire 11 comprises a pair of bead portions 13, a pair of sidewall portions 14 extending outward from these bead portions 13 in a radial direction of the tire, and a tread portion 15 of an approximately cylindrical form connecting radially outer ends of the sidewall portions 14 to each other. Further, the tire 11 comprises a carcass 18 toroidally extending between a pair of bead cores 17 embedded in the bead portions 13 and reinforcing the sidewall portions 14 and the tread portion 15. Each end portion of the carcass 18 is wound around the bead core 17 provided with a stiffener 19 from inside of the tire toward outside thereof. The carcass 18 is comprised of at least one rubberized carcass ply, one carcass ply 20 in this embodiment, which contains many inextensible cords 21 such as steel cords embedded therein and extending substantially in the radial direction (which are inclined at an angle of 80–90° with respect to an equatorial plane S of the tire).

Numeral 24 is a belt arranged at the outside of the carcass 18 in the radial direction, which is comprised by laminating at least two belt layers (three belt layers in the illustrated embodiment). Among these belt layers, a maximum-width belt layer 25 having a widest width is arranged at an innermost side in the radial direction, and a narrow-width belt layer 26 having a width somewhat narrower than the width of the maximum-width belt layer 25 is arranged at the outside of the maximum-width belt layer 25 in the radial direction and adjacent thereto, and further a minimum-width belt layer 27 having a width fairly narrower than the width of the narrow-width belt layer 26 is arranged at the outside of the narrow-width belt layer 26 in the radial direction and adjacent thereto. In the three belt layers 25, 26, 27 are embedded many inextensible cords such as 28, 29, 30 arranged in parallel to each other, respectively. In this case, the cords embedded in each belt layer are inclined within a range of 10–25° with respect to the equatorial plane S, and the cords of at least two belt layers among these belt layers are crossed with each other. In the illustrated embodiment, the inclination angle of the cord 28 in the maximum-width belt layer 25 is 18° upward to the right, and the inclination angle of the cord 29 in the narrow-width belt layer 26 is 18° upward to the left, and the inclination angle of the cord 30 in the minimum-width belt layer 27 is 18° upward to the right, and the inclination directions of the cords in these adjoining belt layers are opposite to each other.

In order to mitigate strain concentration between the belt layers 25 and 26, a cushion rubber 31 having substantially a triangular shape at a section and a maximum gauge at a widthwise outer end 29a of the narrow-width belt layer 26 is interposed between a widthwise outer end portion of the maximum-width belt layer 25 and a widthwise outer end portion of the narrow-width belt layer 26.

Numeral 32 is a tread arranged at the outside of the belt 24 in the radial direction. In an outer surface of the tread 32 are formed a plurality of main grooves 33 extending in the circumferential direction and many lateral grooves (not shown) crossing with these main grooves 33.

Numeral 35 is a pair of reinforcing layers. The reinforcing layer 35 is arranged so as to overlap with the widthwise outer end portion 25a of the maximum-width belt layer 25 or a portion of the maximum-width belt layer 25 located outward from the widthwise outer end 26a of the narrow-width belt layer 26. In the reinforcing layer 35 are embedded many cords 36 slantly arranged with respect to the equatorial plane S and in parallel to each other, in which the inclination direction of the cord 36 is opposite to that of the cord 28 in the maximum-width belt layer 25.

When the reinforcing layer 35 containing many cords 36 arranged in a direction opposite to the cords 28 of the maximum-width belt layer 25 is arranged to overlap with the widthwise outer end portion 25a of the maximum-width belt layer 25, the diamond shape defined by the cords 36 of the reinforcing layer 35 and the cords 28 existing in the widthwise outer end portion 25a of the maximum-width belt layer 25 is deformed in a crushed form due to the tensional deformation in the circumferential direction at the ground contact region of the running tire 11. In this case, the reinforcing layer 35, the widthwise outer end portion 25a of the maximum-width belt layer 25 and rubber surrounding them (including rubber located outward from the widthwise outer end 26a of the narrow-width belt layer 26 in the widthwise direction) displace inward in the widthwise direction together, so that the tensile strain in the widthwise direction produced at the boundary between the widthwise outer end 26a of the narrow-width belt layer 26 and the rubber located outward from the widthwise outer end 26a in the widthwise direction is decreased (or it is a compression strain according to circumstances), whereby the occurrence and development of cracks in the rubber located in the vicinity of ends of the cords 29 in the narrow-width belt layer 26 are effectively controlled. In this way, the belt end separation of the narrow-width belt layer 26 is also prevented effectively.

Moreover, when the outer diameter of the tire is increased during the running for a long time or due to rise of the tire temperature, strain based on the increase of the tire diameter is added to the above strain repeatedly produced during the running in the widthwise outer end 26a of he narrow-width belt layer 26. In this embodiment, however, such an increase of the tire diameter acts to increase the quantity of displacing the rubber surrounding the widthwise outer end portion 25a inward in the widthwise direction, so that the belt end separation is further effectively prevented.

When the cord 36 in the reinforcing layer 35 is an inextensible cord such as steel cord or aramid cord, the influence of such a cord to the cord 28 embedded in the widthwise outer end portion 25a becomes larger and the control of the separation failure can be ensured. However, when the reinforcing layer 35 containing the inextensible cords 36 therein is arranged at the outside of the widthwise outer end portion 25a in the radial direction, stress concentration occurs in the widthwise outer end 35a of the reinforcing layer 35. There is the potential of the occurrence of separation failure prior to the belt end separation in the widthwise outer end 26a of the narrow-width belt layer 26. Therefore, it is favorable that when the cord 36 of the reinforcing layer 35 is the inextensible cord, the reinforcing layer 35 is closely arranged at the inside of the widthwise outer end portion 25a of the maximum-width belt layer 25 in the radial direction largely exerting upon the effect of controlling the widthwise deformation through the carcass 18 as in the illustrated embodiment.

Further, when the cord 36 of the reinforcing layer 35 is the inextensible cord, if the width of the reinforcing layer 35 is made wider, the control of the separation failure can be ensured. However, when the width of the reinforcing layer 35 is widened to locate the widthwise outer end 35a outward from the widthwise outer end 25b of the maximum-width belt layer 25, a large tensile strain is created in the widthwise outer end 35a of the reinforcing layer 35 and hence there is feared the occurrence of the separation failure at the widthwise outer end 35a of the reinforcing layer 35 rather than the widthwise outer end 26a of the narrow-width belt layer 26. Therefore, it is favorable that the widthwise outer end 35a of the reinforcing layer 35 is located inward from the widthwise outer end 25b of the maximum-width belt layer 25 in the widthwise direction as in illustrated embodiment.

Figure 3:
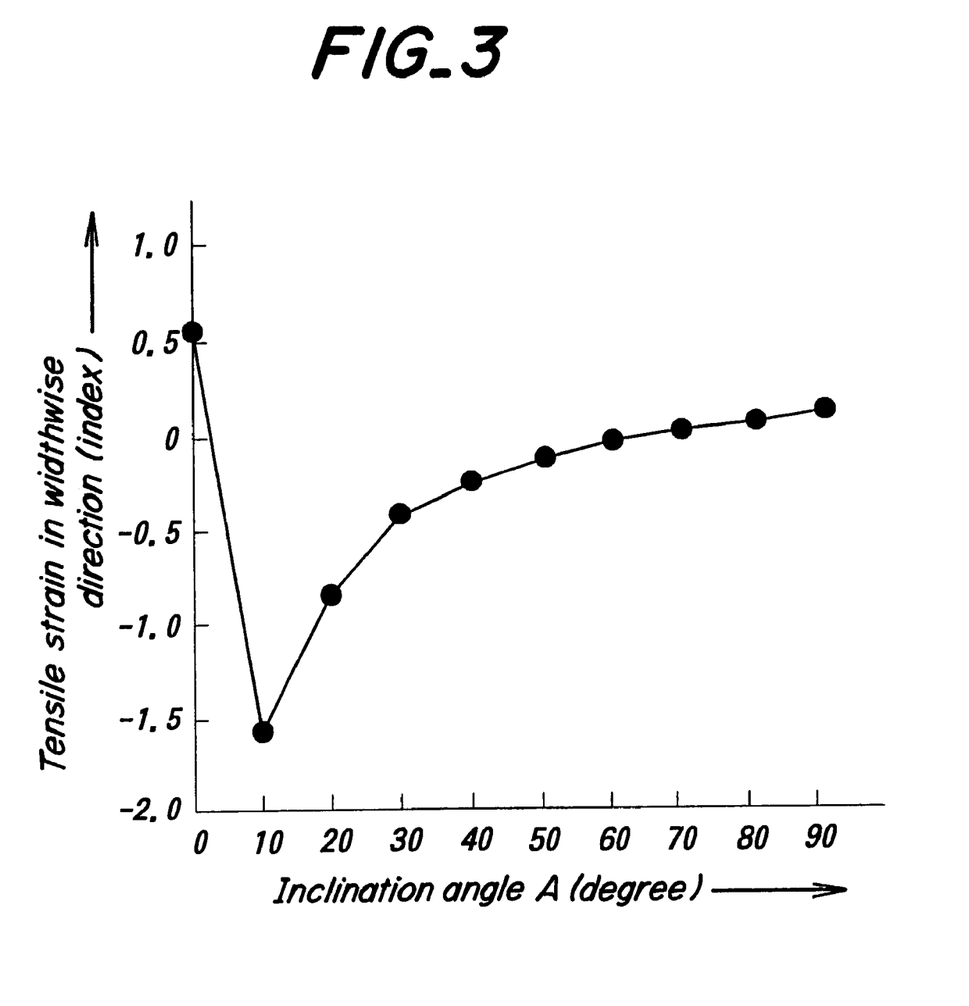
FIG. 3 is a graph showing a relation between a tensile strain in widthwise direction and an inclination angle A.

In the illustrated embodiment, the width of the reinforcing layer 35 is narrowed to terminate the widthwise inner end 35b in the vicinity of the widthwise outer end 26a of the narrow-width belt layer 26. In this case, it is preferable that an inclination angle A of the cord 36 in the reinforcing layer 35 with respect to the equatorial plane S is within a range of 4–60°, preferably not more than 50°. In the illustrated embodiment, the inclination angle A is 10°. When the inclination angle A is less than 4°, the cords 36 are substantially extended in the circumferential direction and hence the tensile strain in the widthwise direction is hardly reduced in the widthwise outer end 26a of the narrow-width belt layer 26 shown in FIG. 3. When it exceeds 60°, the cords 36 are substantially extended in the widthwise direction and hence the tensile strain in the widthwise direction is hardly reduced in the widthwise outer end 26a of the narrow-width belt layer 26 as shown in FIG. 3. As the value of the inclination angle A becomes smaller within the above range, the tensile strength in the widthwise direction can be reduced.

The data shown in FIG. 3 are determined by calculation under the following conditions. That is, there is provided a radial tire for truck and bus having a tire size of 11R22.5 and comprising maximum-width, narrow-width and minimum-width belt layers as shown in FIGS. 1 and 2, each of which layers containing steel cords of 3×0.2+6×0.38 mm arranged at an end count of 25 cords/5 cm and inclined at the aforementioned angle, and a reinforcing layer containing steel cords of 3×0.2+6×0.38 mm arranged at an end count of 25 cords/5 cm as shown in FIGS. 1 and 2, and then the measurement is carried out by applying a load corresponding to the above tire size in load/inflation table of 1998 Year Book of The Tire and Rim Association Inc. In this case, the widths of the maximum-width, narrow-width and minimum-width belt layers and the reinforcing layer are 180 mm, 150 mm, 80 mm and 20 mm, respectively, and the widthwise outer end of the reinforcing layer is located inward by 7 mm from the widthwise outer end of the maximum-width belt layer in the widthwise direction. Moreover, the tensile strain in widthwise direction in FIG. 3 is represented by an index on the basis that strain produced in the widthwise outer end of the narrow-width belt layer including no reinforcing layer is 1.

Figure 4:
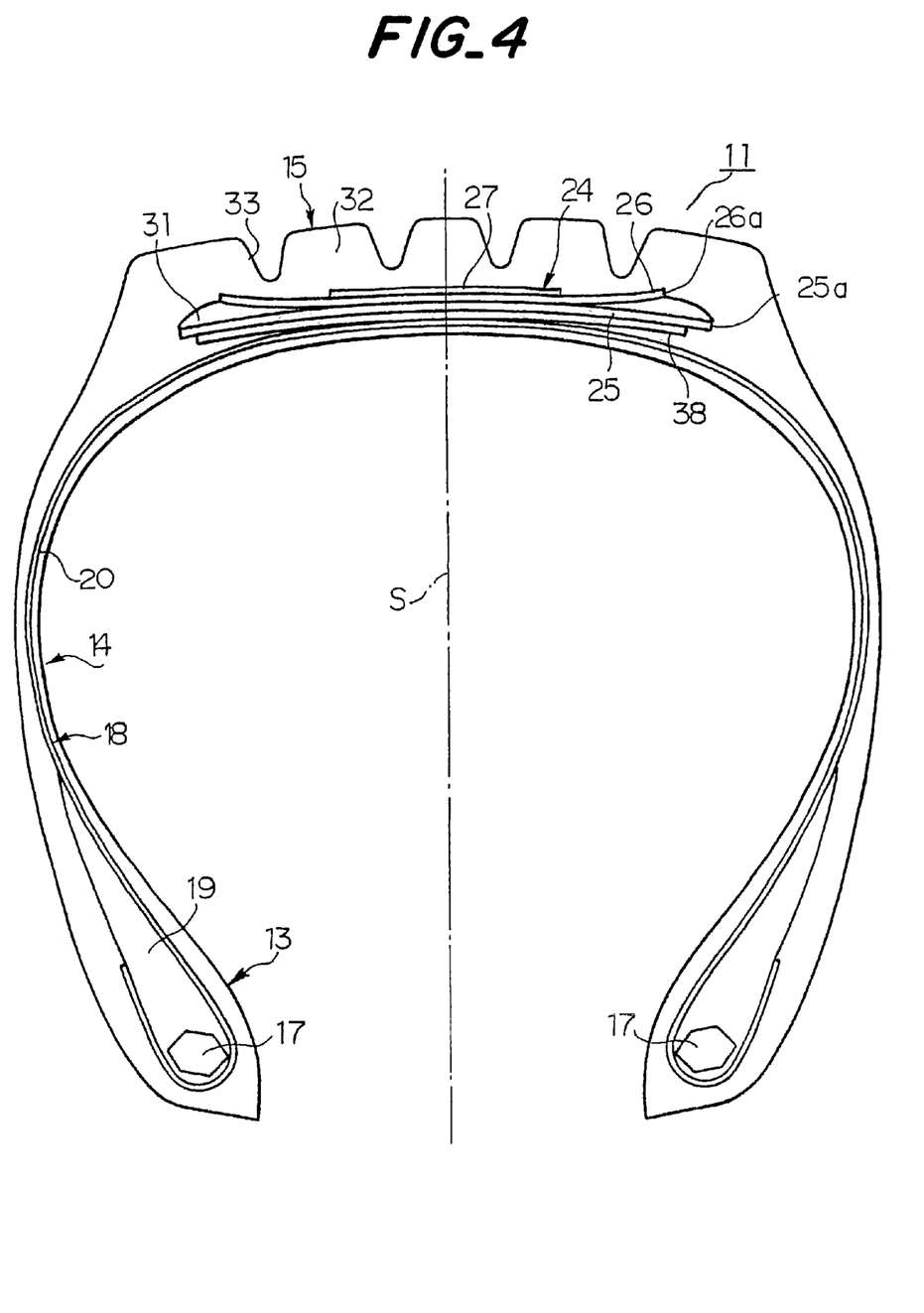
FIG. 4 is a diagrammatically section view of a second embodiment of the pneumatic radial tire according to the invention.
Figure 5:
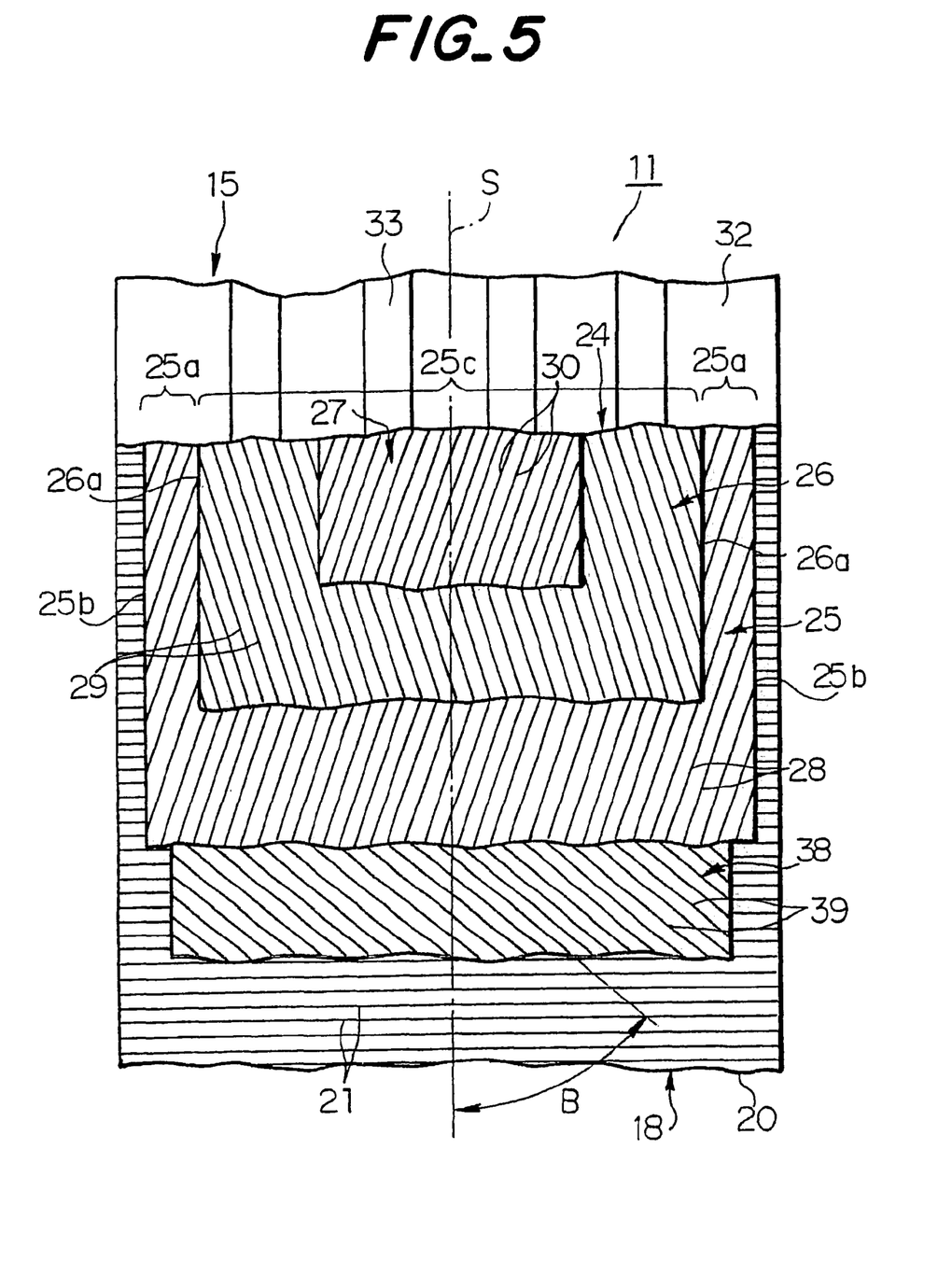
FIG. 5 is a plan view partly broken away of the tire shown in FIG. 4.

A second embodiment of the invention is described with reference to FIGS. 4 and 5. In this embodiment, a reinforcing layer 38 comprises a single layer continued in the widthwise direction by extending each of the reinforcing layers as in the first embodiment inward in the widthwise direction and integrally uniting them at the equatorial plane S in order to enhance the hoop effect of the belt 24 while simplifying the production. In this case, it is preferable that an inclination angle B of an inextensible cord 39 such as steel cord embedded in the reinforcing layer 38 is not less than 34°. In this embodiment, the inclination angle B is 52° upward to the left.

Figure 6:
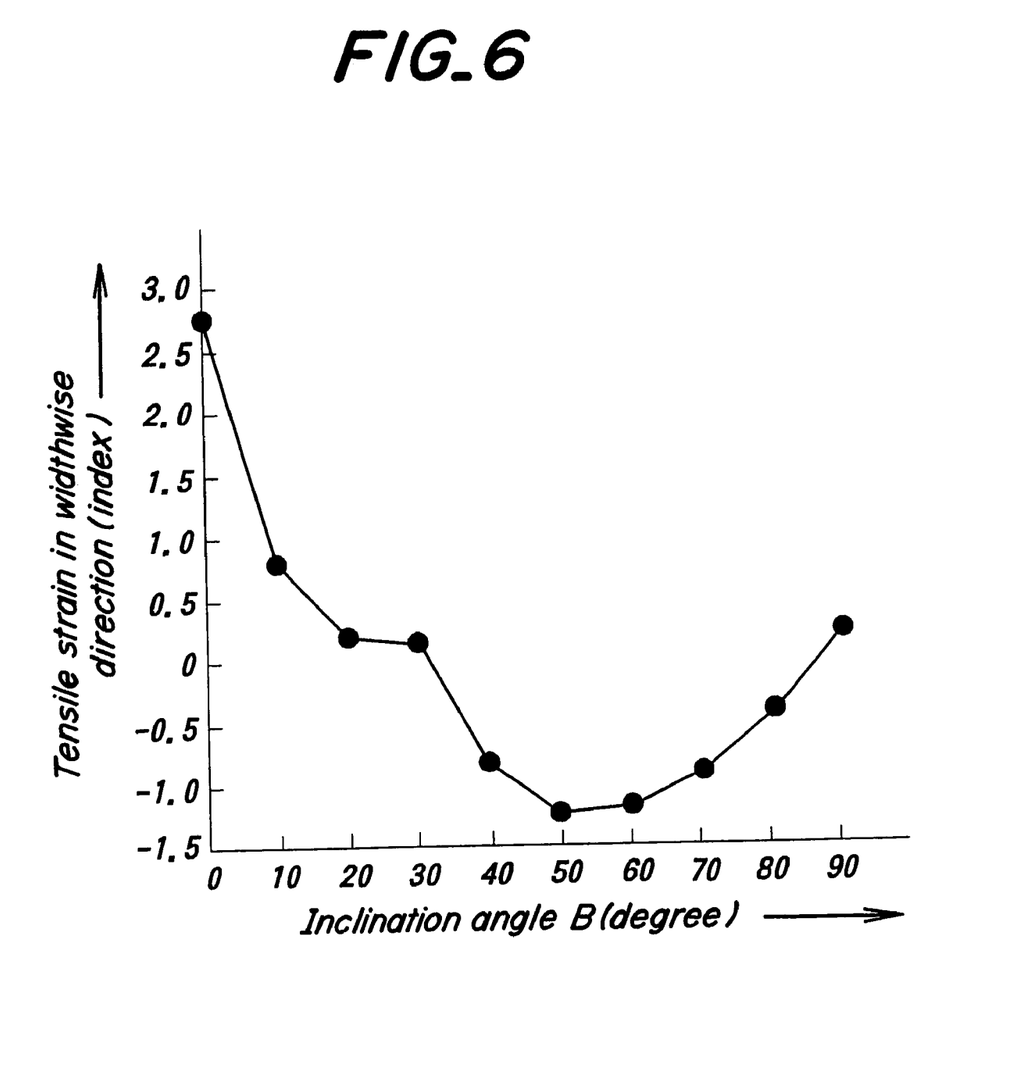
FIG. 6 is a graph showing a relation between a tensile strain in widthwise direction and an inclination angle B.

When the inclination angle B is less than 34°, a contracting quantity of a central portion 25c sandwiched between both widthwise outer end portions 25a in the widthwise direction is increased due to the influence of the reinforcing layer 38. Hence, the tensile strain in the widthwise direction of the widthwise outer end 26a of the narrow-width belt layer 26 can not effectively be controlled as shown in FIG. 6.

When the reinforcing layer 38 is arranged at the inside of the maximum-width belt layer 25 in the radial direction, portions of the cords 39 in the reinforcing layer 38 existing to overlap with the widthwise outer end portion 25a of the maximum-width belt layer 25 act to displace rubber surrounding the widthwise outer end portion 25a inward in the widthwise direction as mentioned in the first embodiment, while portions of the cords 39 overlapping with the central portion 25c of the maximum-width belt layer 25 extend substantially in the widthwise direction to serve as a strut bar, whereby the narrowing of the widthwise central portion 25c is controlled and hence the tensile strain in the widthwise direction at the widthwise outer end 26a of the narrow-width belt layer 26 is effectively controlled. When the inclination angle B exceeds 70°, the former effect is hardly expected, but the latter effect increases, so that the tensile strain in the widthwise direction at the widthwise outer end 26a of the narrow-width belt layer 26 can effectively be controlled even when the inclination angle B finally increases near to 90°. The conditions for the data shown in FIG. 6 are the same as in FIG. 3 except that the width of the reinforcing layer is 165 mm.

Figure 7:
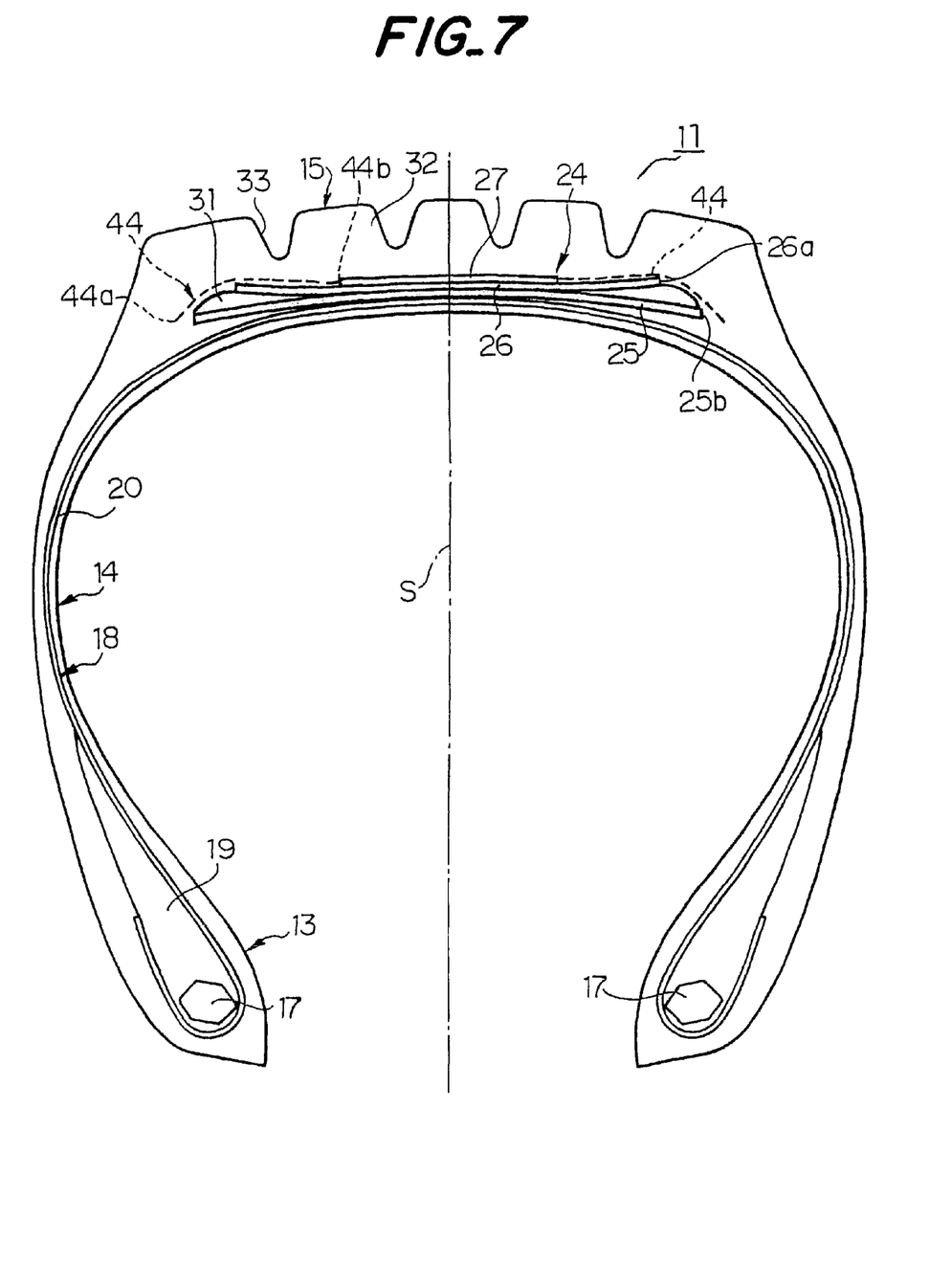
FIG. 7 is a diagrammatically section view of a third embodiment of the pneumatic radial tire according to the invention.
Figure 8:
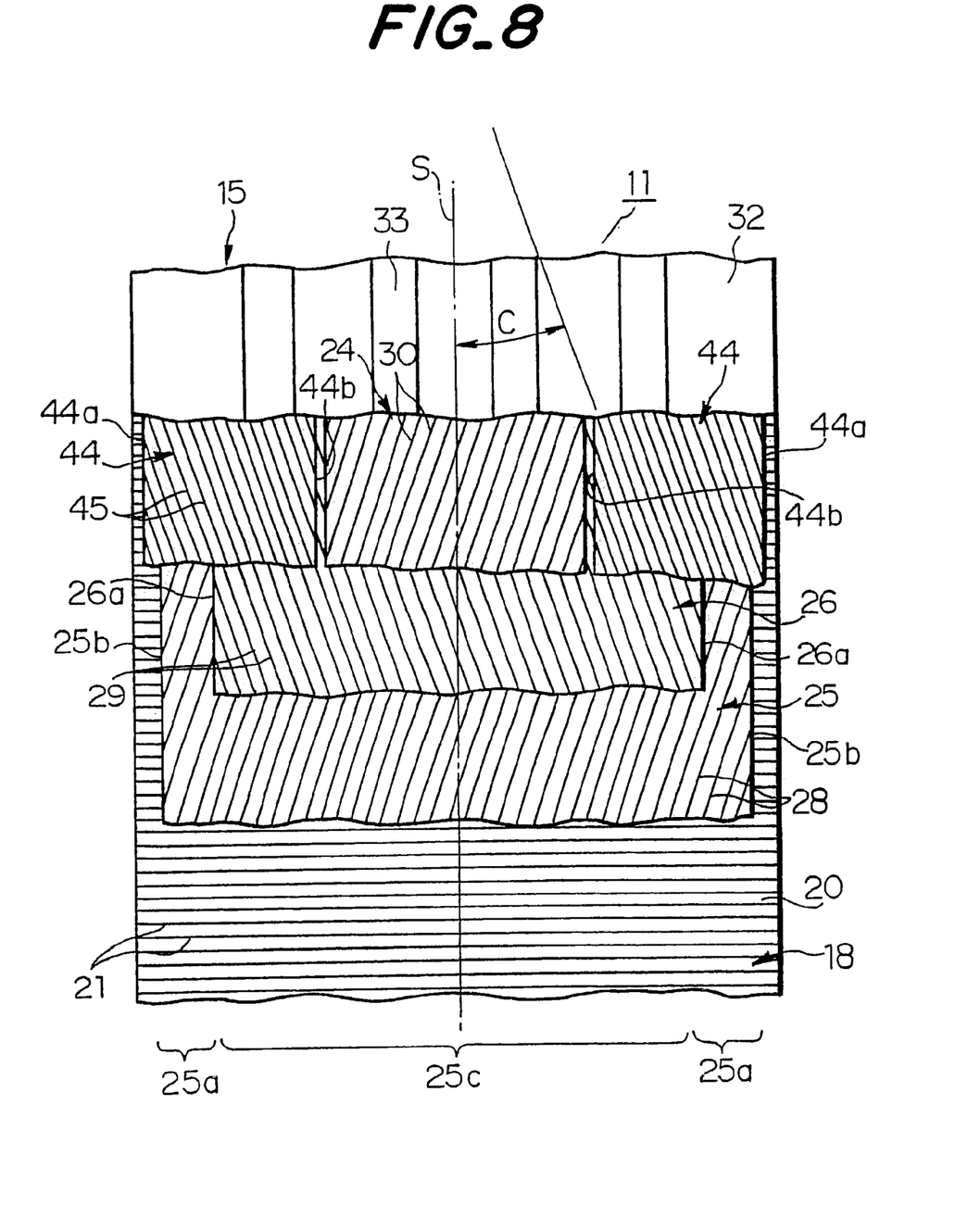
FIG. 8 is a plan view partly broken away of the tire shown in FIG. 7.

A third embodiment of the invention is described with reference to FIGS. 7 and 8. In this embodiment, a reinforcing layer 44 is comprised of organic fiber cords 45 having a small stiffness instead of the inextensible cord such as steel cord. Since the organic fiber cord is low in the influence upon the cord 28 at the widthwise outer end portion 25a, if the reinforcing layer 44 is arranged at the inside of the maximum-width belt layer 25 in the radial direction, rubber located at the outside of the widthwise outer end portion 25a in the radial direction cannot sufficiently be displaced inward in the radial direction. Therefore, it is necessary that when the cord 45 is an organic fiber cord, the reinforcing layer 44 is arranged at the outside of the widthwise outer portion 25a in the radial direction to sandwich rubber located at the outside of the widthwise outer end portion 25a in the radial direction between the widthwise outer end portion 25a and the reinforcing layer 44. As a result the influence upon the rubber is enhanced to ensure the displacement inward in the radial direction.

In the illustrated embodiment, since a relatively thick cushion rubber 31, as previously mentioned, is arranged at the outside of the widthwise outer end portion 25a in the radial direction, the reinforcing layer 44 is arranged outward at a certain distance from the widthwise outer end portion 25a in the radial direction, so that the displacement of the cushion rubber 31 inward in the radial direction through the widthwise outer end portion 25a and the reinforcing layer 44 becomes small. In the illustrated embodiment, therefore, the widthwise outer end 44a of the reinforcing layer 44 is located outward from the widthwise outer end 25a of the maximum-width belt layer 25 in the widthwise direction and the widthwise inner end 44b of the reinforcing layer 44 is located at the outside of the narrow-width belt layer 26 in the radial direction and inward from the widthwise outer end 26a of the narrow-width belt layer 26 in the widthwise direction. Thus, the widthwise outer ends 25b, 26a of the maximum-width belt layer 25 and the narrow-width belt layer 26 are covered with the reinforcing layer 44 so as to largely displace the cushion rubber 31 inward in the radial direction.

Figure 9:
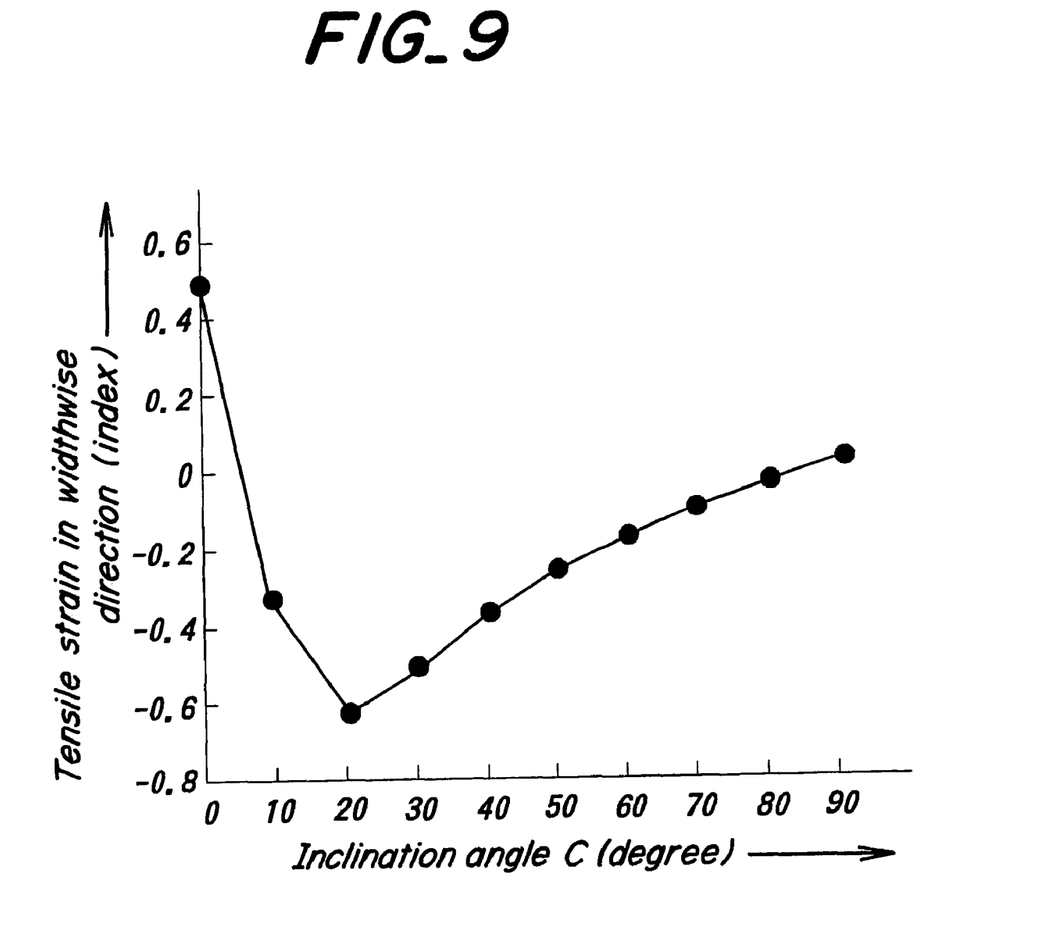
FIG. 9 is a graph showing a relation between a tensile strain in widthwise direction and an inclination angle C.

In this embodiment, it is favorable that an inclination angle C of the cord 45 in the reinforcing layer 44 is not less than 7° with respect to the equatorial plane S of the tire. When the inclination angle C is less than 7°, the cords 45 are extended substantially in the circumferential direction and hence the tensile strain in the widthwise direction at the widthwise outer end 26a of the narrow-width belt layer 26 can not effectively be controlled as shown in FIG. 9. The conditions for the data shown in FIG. 9 are the same as the conditions for the data shown in FIG. 3 except that the reinforcing layer containing organic fiber cords of nylon-6 (1260 d/2) arranged at an end count of 30 cords/5 cm and inclined at an angle C of 20° with respect to the equatorial plane S is arranged at the outsides of the maximum-width belt layer and the narrow-width belt layer as shown in FIGS. 7 and 8. Also, the widthwise outer end of the reinforcing layer is located outward by 15 mm from the widthwise outer end of the maximum-width belt layer in the widthwise direction and the widthwise inner end thereof is located inward by 30 mm from the widthwise outer end of the narrow-width belt layer in the widthwise direction. In the illustrated embodiment, the widthwise inner end of the reinforcing layer 44 is extended in the vicinity of the widthwise outer end of the minimum-width belt layer 27 to cover the widthwise outer end portion of the narrow-width belt layer from the outside in the radial direction.

In the invention, the reinforcing layer 44 used in the third embodiment may be added to the tire 11 shown in the first embodiment, or the reinforcing layer 44 used in the third embodiment may be added to the tire shown in the second embodiment, whereby the belt end separation can more surely be controlled.

There are provided six tires, i.e. a conventional tire wherein the reinforcing layer is omitted from the tire used for the measurement of the data in FIG. 3, a test tire 1 used for obtaining the data of FIG. 3, a test tire 2 used for obtaining the data of FIG. 6, a test tire 3 used for obtaining the data of FIG. 9, a test tire 4 obtained by adding the reinforcing layer of the test tire 3 to the test tire 1, and a test tire 5 obtained by adding the reinforcing layer of the test tire 3 to the test tire 2 for evaluating the resistance to belt end separation. Then, each of these tires is mounted onto a truck and run on general-purpose road including unpaved road over a distance of 70,000 km. Thereafter, the tire is cut to measure a length of crack created in the widthwise outer end of the narrow-width belt layer. When the measured result is represented by an index on the basis that the conventional tire is 100, the index value of the crack length in the test tires 1, 2, 3, 4 and 5 is 50, 30, 55, 28 and 33, respectively. As seen from these results, the belt end separation is effectively controlled in the tires according to the invention.

As mentioned above, according to the invention, the belt end separation can effectively be prevented in the pneumatic radial tire.

What is claimed is:
1. A pneumatic radial tire comprising; a radial carcass of at least one rubberized cord ply toroidally extending between a pair of bead cores, a belt superimposed about a crown portion of the carcass and comprised of at least three belt layers, and a tread arranged at an outside of the belt in a radial direction, said belt comprises a maximum-width belt layer having a widest width of the layers of said belt and containing many cords slantly arranged with respect to an equatorial plane of the tire and a narrow-width belt layer arranged at the outside of the maximum-width belt layer in the radial direction and containing many cords arranged in an oppositely inclined direction to the cords of the maximum-width belt layer, a reinforcing layer containing many cords arranged in an oppositely inclined direction to the cords of said maximum-width belt layer and arranged to overlap with an outer end portion of said maximum-width belt layer located outward from an outer end of the narrow-width belt layer in the widthwise direction thereof, and said reinforcing layer having a cord inclination angle B of not less than 34° with respect to the equatorial plane, wherein the cords of the reinforcing layer are inextensible cords and the reinforcing layer is closely arranged at the inside of the maximum-width belt layer in the radial direction, wherein the reinforcing layer is extended inward in the widthwise direction to form a one-piece body on the equatorial plane.

2. A pneumatic radial tire according to claim 1, wherein the widthwise outer end of the reinforcing layer is located inward from the widthwise outer end of the maximum-width belt layer in the widthwise direction.

* * * * *